United States Patent
Singer

[15] 3,705,188
[45] Dec. 5, 1972

[54] NAPHTHYL-N-CYANOFORMYL CARBAMATES

[72] Inventor: Malcolm Scott Singer, Riohmond, Calif.

[73] Assignee: Chevron Research Company, San Francisco, Calif.

[22] Filed: Sept. 8, 1970

[21] Appl. No.: 70,498

[52] U.S. Cl.............260/479 C, 260/544 Y, 424/300
[51] Int. Cl..............................................C07c 125/06
[58] Field of Search................................260/479 C

[56] References Cited

UNITED STATES PATENTS 2,533,189   12/1950   Flory et al. ................260/479

OTHER PUBLICATIONS

Chem. Abstracts, Vol. 64 (1966), page 9633 g.

Primary Examiner—James A. Patten
Attorney—A. L. Snow, F. E. Johnston, G. F. Magdeburger, John Stoner, Jr. and Dix A. Newell

[57] ABSTRACT

Compounds of the formula:

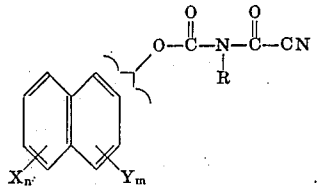

wherein R is alkyl of 1 to 4 carbon atoms, X and Y are halogen of atomic number 9 to 35, nitro, alkyl of 1 to 4 carbon atoms or alkoxy of 1 to 4 carbon atoms, n is 0 to 3, and m is 0 to 3. The compounds are insecticides.

3 Claims, No Drawings

NAPHTHYL-N-CYANOFORMYL CARBAMATES

BACKGROUND OF THE INVENTION

1. Field of the Invention

The present invention is directed to α- or β-naphthyl-N-cyanoformyl-N-alkyl carbamates and their use as insecticides.

2. Prior Art

Netherlands U.S. Pat. No. 6,500,321 (64 Chem.Abs. 9633g [1966]) discloses certain cyanothioformylphenyl carbamates as useful insecticides, fungicides, bactercides, herbicides, etc.

SUMMARY OF THE INVENTION

It has now been discovered that α- or β-naphthyl-N-cyanoformyl-N-alkyl carbamates are exceptionally effective in the control of insects, e.g., aphids, cockroaches, milkweed bugs and dock beetles.

DESCRIPTION OF THE INVENTION

Compounds of the present invention are of the formula:

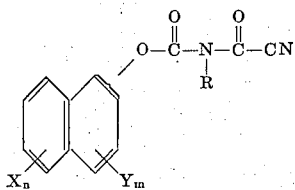

wherein R is alkyl of one to four carbon atoms, X and Y are halogen of atomic number 9 to 35 (fluorine, chlorine or bromine), nitro, alkyl individually of one to four carbon atoms or alkoxy individually of one to four carbon atoms, $n$ is 0 to 3, and $m$ is 0 to 3.

R can represent, e.g., methyl, ethyl, n-propyl, isopropyl, n-butyl, isobutyl or t-butyl. It is preferred that R is methyl.

X and Y (which may be the same or different) are preferably halogen of atomic number 17 to 35 (chlorine or bromine), nitro groups, methyl or methoxy. Preferably $n$ and $m$ will be from 0 to 1. The preferred compounds of the present invention will have $n$ and $m$ equal to 0, i.e., the unsubstituted naphthyl carbamates.

Representative compounds of the present invention include 1-naphthyl-N-cyanoformyl-N-methyl carbamate, 2-naphthyl-N-cyanoformyl-N-methyl carbamate, 1-(2-chloronaphthyl)-N-cyanoformyl-N-methyl carbamate, 1-(4-chloronaphthyl)-N-cyanoformyl-N-methyl carbamate, 1-(2,4-chloronaphthyl)-N-cyanoformyl-N-methyl carbamate, 1-(6-nitronaphthyl)-N-cyanoformyl-N-methyl carbamate, 1-(3-methylnaphthyl)-N-cyanoformyl-N-methyl carbamate, 2-(4-methoxynapthyl)-N-cyanoformyl-N-methyl carbamate and 1-naphthyl-N-cyanoformyl-N-ethyl carbamate.

The compounds of the present invention are prepared by first reacting an N-alkyl cyanoformamide with phosgene (present in a solvent such as benzene) in the presence of an acid acceptor, at a temperature of from 5° to 35° C. for a time from 1 to 4 hrs., according to the following equation:

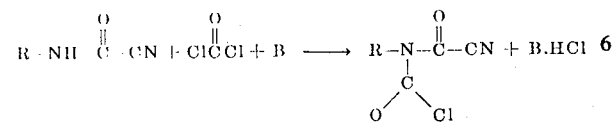

wherein R is as described above and B is an acid acceptor. Generally, the N-alkyl cyanoformamide-phosgene mole ratio will be from 1:1 to 1:2. The amount of acid acceptor such as triethylamine, pyridine or dimethylaniline should be at least equal in mols to the amount of the N-alkyl cyanoformamide. The N-alkyl-N-chlorocarbonyl cyanoformamide product is then reacted with α- or β-naphthol suitably substituted as desired, per the following equation:

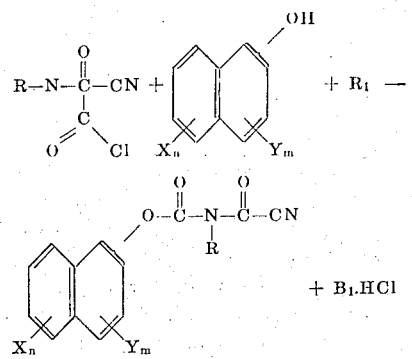

wherein R, X, Y, $m$ and $n$ are as described above, and $B_1$ is an acid acceptor. The reactants in the latter reaction will preferably be in equimolar amounts. An acid acceptor such as pyridine or dimethylaniline should be present. The latter is preferred. The reaction is carried out in a solvent, e.g., benzene, in amount ½ to 2 molar. Generally, the amount of acid acceptor will equal the mols of the N-alkyl-N-chlorocarbonyl cyanoformamide. The latter reaction usually will be at a temperature of 5° to 20° C. for a time of ½ to 4 hrs. The desired naphthyl-N-alkyl carbamate product can then be separated by stripping off the solvent and purified by washing in ethanol, etc.

For example, α-naphthyl-N-cyanoformyl-N-methyl carbamate was prepared by reacting 8.4 g. (0.1 mol) of N-methyl cyanoformamide with 80 g. of a 12.5 percent solution of phosgene in benzene and in the presence of 10.1 g. (0.1 mol) of triethylamine. The N-methyl cyanoformamide and phosgene-benzene mixture was first mixed together and the triethylamine added slowly with cooling. The reaction mixture was allowed to warm up to room temperature with stirring continued for about one-half hour. The triethylamine hydrochloride was filtered out and the benzene solvent evaporated leaving 8.1 g. of N-methyl-N-chlorocarbonyl cyanoformamide. This latter material and α-naphthol were then dissolved in benzene. Dimethylaniline was added slowly with cooling. The mixture was allowed to warm up to room temperature. After one-half hour 15 ml. of water was added. A precipitate formed which was filtered out. The layers of the filtrate were then separated, the benzene layer being washed with dilute hydrochloric acid and with water and dried with calcium chloride. The solvent was evaporated off leaving a solid material having a melting point of 162°–165° C. The nitrogen analysis showed 11.12 percent found versus 11.0 percent calculated.

In addition to the specific formulations and application techniques described below, one or more of the carbamates of the present invention may be applied in other liquid or solid formulation to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more carbamates and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular carbamate compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

As examples of the usefulness of the compounds of the present invention, the following tests were conducted. For comparison phenyl N-cyanoformyl-N-methyl carbamate, prepared generally by the procedure described above, was also tested. Test results are reported in Table I.

Test Procedures

Aphids (*Aphis gossypii* Glover): An acetone solution of the candidate toxicant containing a small amount of nonionic emulsifier was diluted with water to 30 ppm. Cucumber leaves infested with the cotton aphids were dipped in the toxicant solution. Mortality readings were then taken after 24 hours.

American Cockroach (*Periplaneta americana* L.): A 500 ppm acetone solution of the candidate toxicant was placed in a microsprayer (atomizer). A random mixture of anesthetized male and female roaches was placed in a container and 55 mg. of the above-described acetone solution was sprayed on them. A lid was placed on the container. A mortality reading was made after 24 hours.

Milkweed Bug (*Oncopeltus fasciatus*): A 250 ppm acetone solution of the candidate toxicant was placed in a microsprayer (atomizer). A random mixture of anesthetized male and female milkweed bugs was placed in a container and 55 mg. of the above-described acetone solution was sprayed on them. A lid was placed on the container. A mortality reading was made after 24 hours.

Dock Beetle (*Gastrophysa cyanea Melsh*): A 40 ppm toxic solution was prepared by mixing 10 mg. toxicant to 10 ml. acetone and diluting with water. Dock weed (Rumex) leaves were dipped and held immersed for about 3 seconds in the toxicant solution. The leaves were then dried and placed in contact with dock beetle larvae. The larvae and leaves were held in an incubator at 70°–75° F. for 24 hours, after which mortality determinations were made.

TABLE I

| Compound | Aphids | Cockroach | % Mortality Milkweed bug | Dock Beetle |
|---|---|---|---|---|
| 1-naphthyl-N-cyanoformyl-N-methyl carbamate | 100 | 96 | 73 | 100 |
| Phenyl N-cyanoformyl-N-methyl carbamate | 0 | 0 | — | — |

As will be evident to those skilled in the art, various modifications on this invention can be made or followed, in the light of the foregoing disclosure and discussion, without departing from the spirit or scope of the disclosure or from the scope of the following claims.

I claim:

1. Compound of the formula

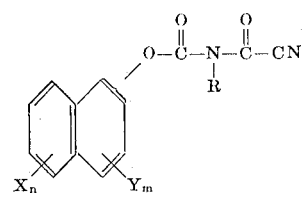

wherein R is alkyl of one to four carbon atoms, X and Y are halogens of atomic number 9 to 35 (chlorine, fluorine or bromine), nitro groups, alkyl groups individually of one to four carbon atoms, alkoxy groups individually of one to four carbon atoms, and $n$ is 0 to 3, and $m$ is 0 to 3.

2. Compound of claim 1 wherein X and Y are halogen of atomic number 17 to 35, nitro groups, methyl or methoxy, $n$ is 0 to 1, and $m$ is 0 to 1.

3. Compound of claim 1 wherein R is methyl, and $m$ and $n$ are 0.

* * * * *